United States Patent
Seddon

(10) Patent No.: US 6,275,624 B1
(45) Date of Patent: Aug. 14, 2001

(54) OPTICAL SWITCH WITH FLEXURE PIVOT

(75) Inventor: Richard Ian Seddon, Santa Rosa, CA (US)

(73) Assignee: Optical Coating Laboratory, Inc., Santa Rosa, CA (US)

( * ) Notice: Subject to any disclaimer, the term of this patent is extended or adjusted under 35 U.S.C. 154(b) by 0 days.

(21) Appl. No.: 09/454,022

(22) Filed: Dec. 3, 1999

(51) Int. Cl.[7] .................................................. G02B 6/26
(52) U.S. Cl. ................... 385/16; 385/18; 359/224
(58) Field of Search ..................... 385/16–23; 359/223, 359/224

(56) References Cited

U.S. PATENT DOCUMENTS

| | | |
|---|---|---|
| 3,479,107 | 11/1969 | Blythe et al. . |
| 4,303,303 | 12/1981 | Aoyama . |
| 4,497,465 | 2/1985 | Yeakley et al. ..................... 248/466 |
| 4,790,621 | 12/1988 | Calaby et al. . |
| 4,802,720 | 2/1989 | Paulsen . |
| 4,893,891 | 1/1990 | Fujita et al. . |
| 4,997,123 | 3/1991 | Backus et al. ........................ 228/182 |
| 5,594,820 | 1/1997 | Garel-Jones et al. .................. 385/22 |
| 5,620,169 | 4/1997 | Payne ................................... 267/160 |
| 5,838,847 | 11/1998 | Pan et al. ............................... 385/18 |
| 5,867,617 | 2/1999 | Pan et al. ............................... 385/18 |
| 5,940,553 | 8/1999 | Murakami et al. .................... 385/22 |

FOREIGN PATENT DOCUMENTS

WO 01/13151 A1   1/2001  (WO) .

*Primary Examiner*—James Phan

(57) ABSTRACT

An optical switch for use in optical telecommunication applications is configured to tolerate vibration and shock loading, preserving optical alignment at a plurality of switching positions and during the switching operation, and to effectively perform precise and accurate switching operations in a variety of environmental conditions. Switching operations are performed when an actuator that responds to a switching stimulus acts upon a flexure pivot device that in turn accurately and reproducibly displaces an optical element that operates upon a light signal.

16 Claims, 10 Drawing Sheets

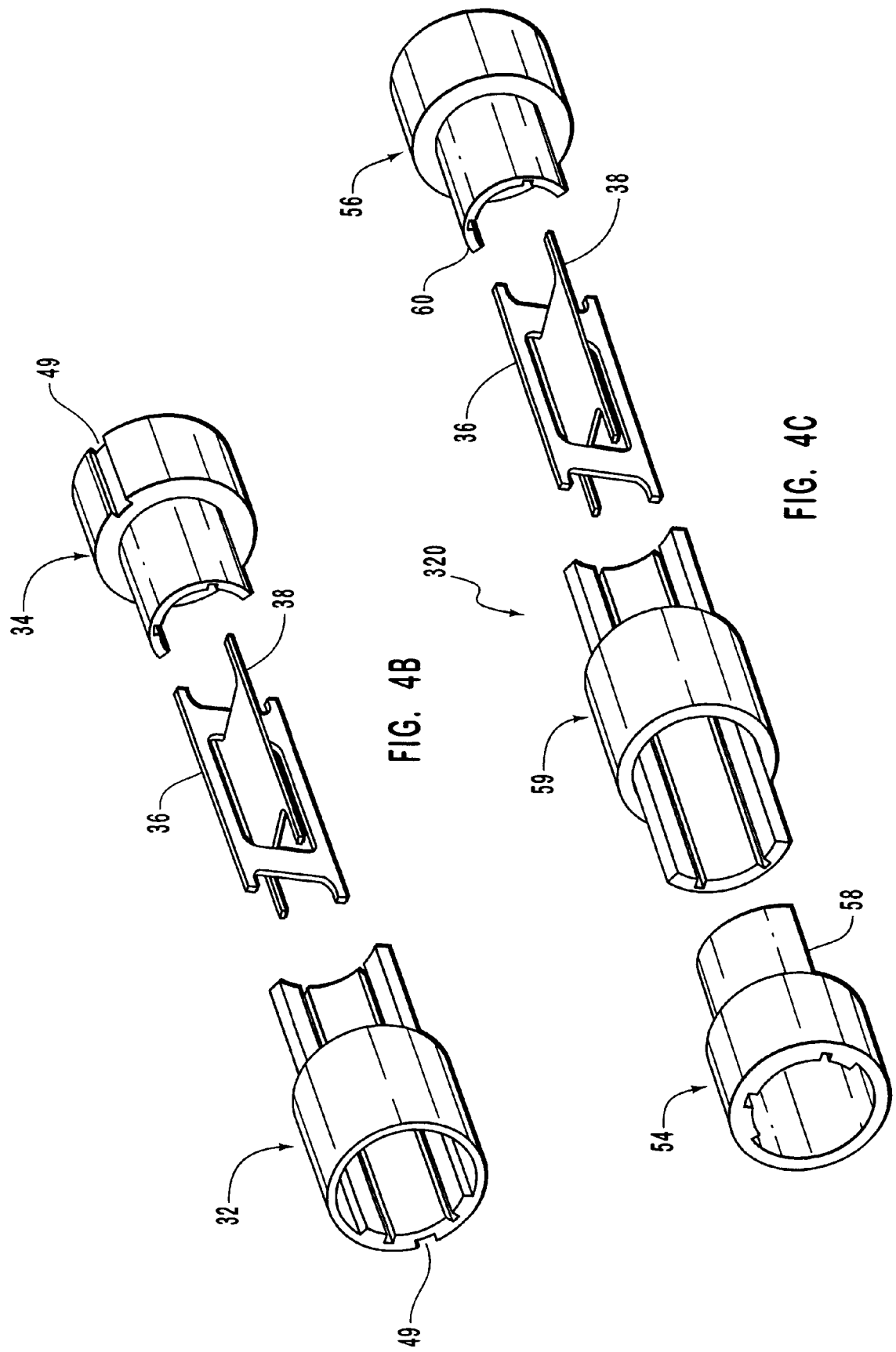

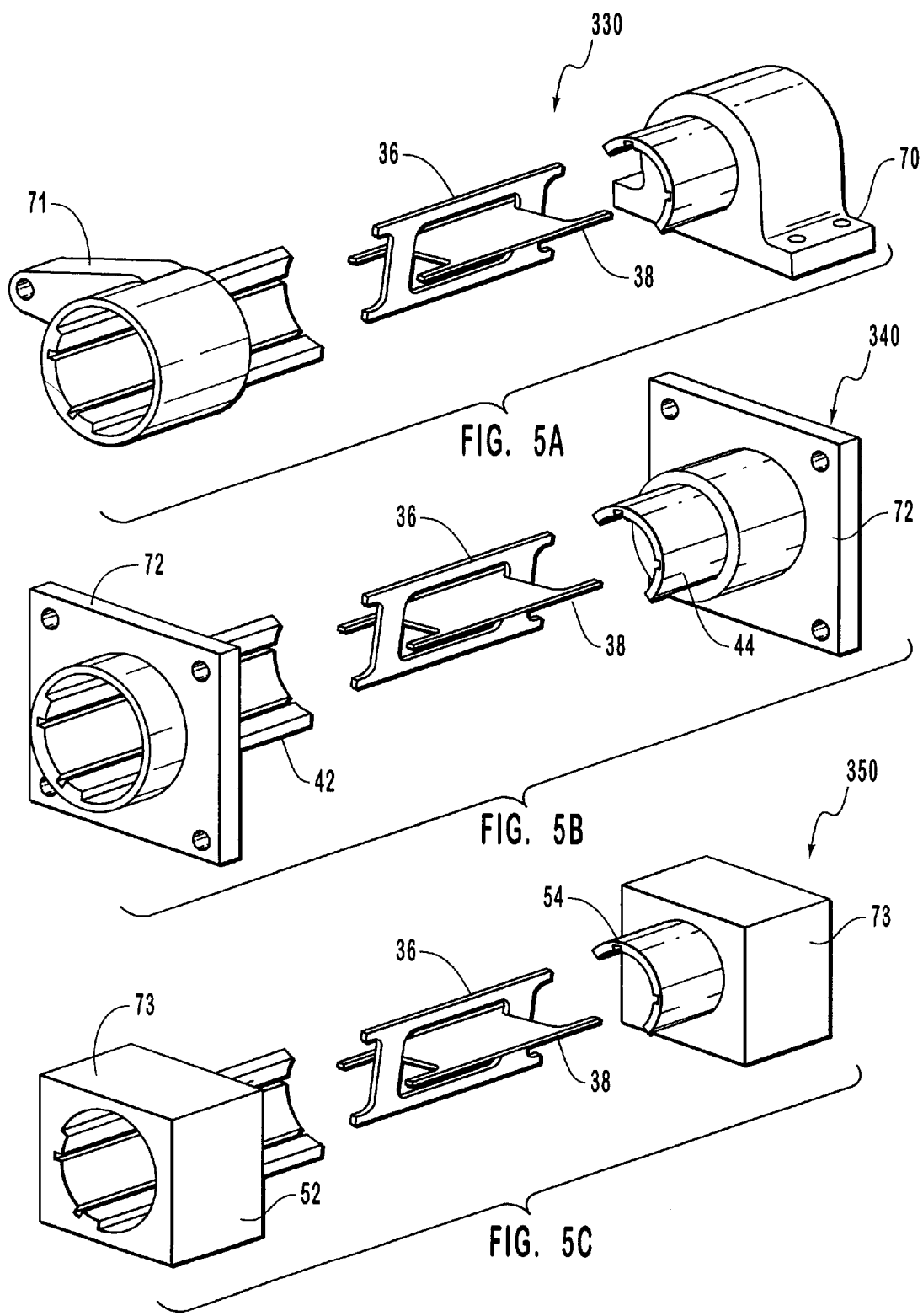

OPTICAL SWITCH WITH FLEXURE PIVOT

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. The Field of the Invention

This invention relates to optical communication systems. More particularly, embodiments of the present invention relate to an optical switch using a flexure pivot.

2. Relevant Technology

Optical communication systems are becoming a substantial and fast-growing constituent of traditional communication networks. Optical communication systems are particularly advantageous because they provide the capability to convey information at a much higher transmission rate than traditional electrical wire systems. Moreover, optical-based communications systems are less susceptible to certain types of noise, such as from lightning and electromagnetic radiation, can be implemented with lighter weight cable, and provide better signal quality over extended distances compared to electrical wire systems.

Optical communication systems use waveguides to transfer light from one location to another. A waveguide is a device that generally confines and guides a propagating electromagnetic wave, such as light. An example of a waveguide is an optical fiber, which is typically a thin, circular, transparent fiber that guides light down the length of the fiber.

In addition to using optical fibers for guiding a light signal, other optical devices are used to further manipulate the light signal. In particular, devices are used to connect a fiber or a fiber optic component to another component or another fiber. Such devices typically provide mechanical support for connecting waveguides while allowing the transmittance of the desired light. One example of such an optical interconnection device is an optical switch. In optical telecommunication systems, optical switches can be used to switch light from one input optic fiber to one or the other of two output optic fibers, for example. This type of switch is often referred to as a 1×2 switch. Other switch types may use more than one input and exit fiber. These are designated as N×N or N×M switches. For example, a 1×8 switch has one input and eight potential outputs.

Opto-mechanical switches physically move fibers or optical components so they are in a position to transfer light to the desired output fiber. Moveable optical components can be a mirror, a lens assembly, a prism, a filter, or any similar type of optical component that can be used to reflect, refract, retransmit or otherwise manipulate a light signal, as well as a fiber. In a typical configuration, an optical switch may include a graded index ("GRIN") lens or equivalent aspheric lens to expand and collimate the light beam received at an input fiber, or to collect and direct the light to an output fiber. In one switch position, the light beam may be directly passed through a receiving GRIN lens to a first output fiber via another GRIN lens. The switch can be activated to a second switch position that causes an optical component (mirror, filter, prism, etc.) to be placed in the path of the incoming collimated light beam. Depending on the position and type of the optical component element, the light beam is redirected towards a selected output fiber. A feature of opto-mechanical switches is that the switching operation depends upon the ability to move an optical component between switch positions.

Since these switches depend on mechanical movement, they necessarily rely upon moving parts. This can result in a variety of problems. In particular, the action of an opto-mechanical switch must be precise and accurate, due to the extremely small physical dimensions of typical optical transmission media. For example, in typical applications an optical fiber as small as 8 micrometers (8 $\mu$m) in diameter must be re-imaged on a similarly sized fiber after reflection, refraction, or transmission by or through the moveable component operated by the switch. A slight misalignment between the moveable component and the input and/or output fiber can result in the loss of signal integrity. Such misalignment might arise from machining tolerances or wear of mating parts, for example. Precision must be maintained even when the switch is being operated at high switching speeds, and over long periods of time.

Other factors contribute to the problem of maintaining optical alignment within an opto-mechanical switch. Communications applications often subject an optical switch to a wide range of adverse environmental conditions, including wide ranges in temperature, pressure and humidity. Operating conditions may also be extreme in other respects. For instance, some switches may be exposed to mechanical vibrations that can affect the optical alignment of the switch. Applications also may require that the optical switch be operable for hundreds of thousands of cycles, and after long periods of idleness. Regardless of the environmental circumstances however, the switch must still maintain accurate and precise optical alignment.

Various approaches for providing a suitable switching mechanism for use in optical switches have used mechanical sliders, rollers, pivot assemblies, etc., none of which have been entirely satisfactory. For example, U.S. Pat. No. 5,594,820 discloses an opto-mechanical switch in which the moveable optical component is carried on a flexible suspension unit by two generally parallel flexures that flex in common. An actuator mechanism applies an effort at the end of the flexures that is opposite to the end attached to the anchorage block. This bends the flexures, which moves the optical component to perform the switching operation. However, a suspension mechanism with this general configuration can be sensitive to vibration, and thus may not be appropriate for use in certain environments.

Other switches utilize sliding elements to provide physical actuation of the switch mechanism. Such approaches are disclosed in U.S. Pat. Nos. 4,790,621 (the '621 patent) and 4,303,303 (the '303 patent). The '621 patent discloses an optical switch with a sliding element switch with spring latches. The '303 patent discloses an optical switch in which a parallelogram prism is moved on a sliding block between two stops. However, switches that rely on such sliding mechanisms undergo frictional contact, which produces wear. Often, such devices require ongoing maintenance, such as lubrication, and they may have shorter operational lifetimes.

Given the problems with the prior art solutions, there is a need in the art for an optical switch that allows for precise and accurate positioning of the switch's movable optical component. In addition, it is desirable to have an optical switch in which precise and accurate operation and alignment of the movable optical component(s) can be achieved at one or more switch positions. Moreover, such alignment should be maintained throughout the entire switching motion and at high switching speeds. It is also desirable that the highly accurate and reproducible operation of the optical switch be accomplished within adverse environmental conditions, such as wide temperature and humidity ranges, vibration, and after long periods of inactivity. Finally, the switch should be capable of undergoing a high number of switching cycles without failure or requiring ongoing maintenance.

BRIEF SUMMARY OF THE INVENTION

Given the foregoing problems and shortcomings in the prior art, it is an overall object of the present invention to provide an optical switch that provides precise and accurate movement of an optical device between switch positions. The present invention addresses these objectives by use of a flexure pivot coupled to an armature supporting an optical device. The flexure pivot provides stiffness within the plane of rotation of the pivot, thereby maintaining precise control of the positioning of the optical device.

It is a related objective of the present invention to provide an optical switch that utilizes a switching mechanism that maintains precise and accurate movement under different optical alignment conditions and at multiple switching positions.

Yet another object of the present invention is to provide a switching mechanism that maintains optical alignment of the optical components throughout the entire switching motion and thereby maintains data transmission integrity.

Still another objective of the present invention is to provide an optical switch that is capable of providing and maintaining such precision in the presence of adverse environmental and operating conditions, including temperature, humidity and/or pressure ranges, and operating conditions that experience excessive or continuous vibrations or shock.

An additional object of the present invention is to provide an optical switch that provides reliable and accurate operation over many switching cycles and after long intervening periods of little or no switching activity. A related objective is to provide an optical switch that does not utilize rolling or sliding components, so as to reduce operational wear, and that negates the need for lubrication and related types of switch maintenance.

In general, the foregoing objectives are achieved with an optical switch having a moveable optical component, such as a fiber, mirror, filter, prism, attenuator, or similar type of optical element that is capable of reflecting, transmitting, and/or absorbing a light signal in a desired fashion. The optical switch further includes means for providing a flexure pivot to allow movement of the optical component between a plurality of predefined switch positions. Moreover, the flexure pivot has a low torsional stiffness about the axis of the pivot, and a relatively higher torsional stiffness in directions substantially perpendicular to the pivot axis. The flexure pivot provides for an accurate and reproducible movement of the optical component that is then able to accurately reflect, refract, attenuate, filter, or otherwise modify an input signal to a selected output port.

In a preferred embodiment, an optical component is mounted on an armature. The armature is connected to the flexure pivot, which allows the armature to pivot about an axis, thereby moving the optical component in the plane of rotation. The optical component is mounted so that it maintains its optical orientation relative to the plane of rotation of the armature. In one embodiment, physical stops are provided to limit the rotation of the armature and provide the operating stop positions of the optical switch. The stops do not affect the orientation of the optical components relative to the plane of rotation. The armature can be balanced to minimize sensitivity to vibration. Other alternative embodiments may include cushioned stops, or a magnetic gap between the armature stops and the pole piece of a magnetic solenoid used to actuate the switch.

These and other objects, features, and advantages of the present invention will become more fully apparent from the following description and appended claims, or may be learned by the practice of the invention as set forth below.

BRIEF DESCRIPTION OF THE DRAWINGS

FIGS. 4A and 4B are exploded perspective views of an embodiment of a cantilever flexure pivot;

FIG. 4C is an exploded perspective view of an embodiment of a double-ended symmetrical flexure pivot;

FIGS. 5A, 5B, and 5C show exploded perspective views of flexure pivots with different structural features at the ends of the respective support structures;

DETAILED DESCRIPTION OF PRESENTLY PREFERRED EMBODIMENTS

The present invention is directed to a switch for use in optical communications applications. In particular, the optical switch of the present invention provides switching of, or other operation upon, light signals by displacing an optical component in the path of the light signal. As used herein, the term "moveable optical component", "optical component", or "optical device" is intended to mean any type of optical element that is used to redirect, reflect, refract, refocus, transmit, or otherwise manipulate, a light signal, including, but not limited to, an optical waveguide, a mirror, a prism, a diffraction grating, a lens, an optical attenuator, or a filter. Similarly, it is understood that more than one element or one type of element might be mounted on the armature, and that a single optical device might perform a variety of functions, such as transmission of one wavelength and reflection of other wavelengths of light.

Embodiments of the present invention are more specifically directed towards providing the ability to precisely displace the optical component in a predictable and accurate manner. This is especially important in an optical communications environment due to the nature of the light signal itself, and to the small sizes of the optical fibers that are typically used. The operating characteristic of the optical switch of the present invention provides the sort of precise and accurate movement needed to maintain optical alignment between switch positions, and in some applications, to maintain optical alignment during switching.

Figure 1A:
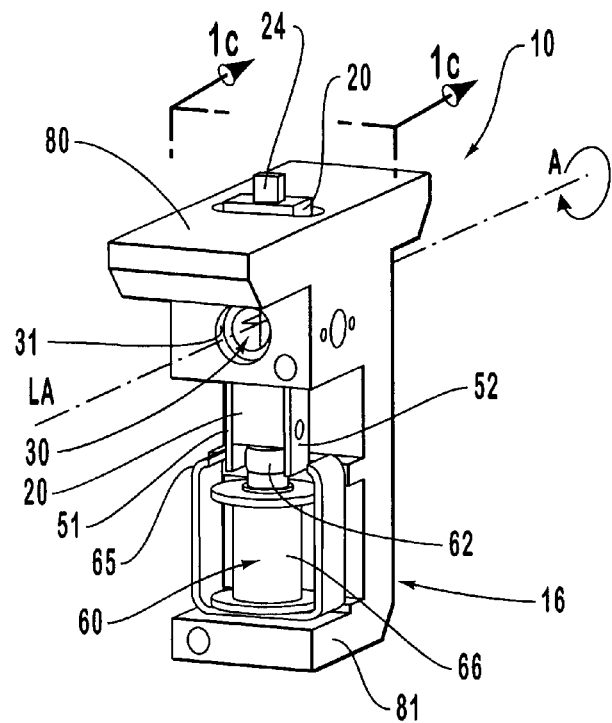
FIGS. 1A and 1B show schematic perspective views of an optical switch according to an embodiment of the present invention.
Figure 1B:
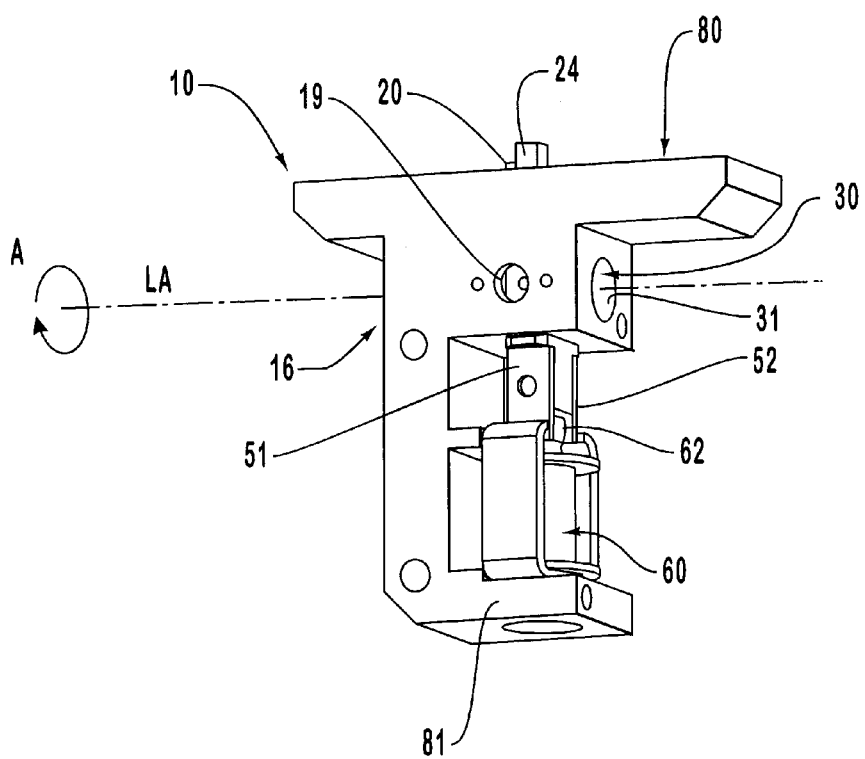
Figure 1C:
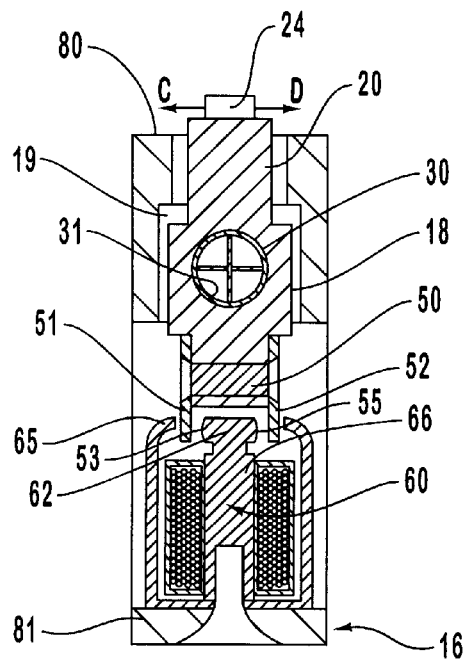
FIG. 1C is a simplified cross sectional view taken along lines 1C—1C in FIG. 1A.

FIGS. 1A–1C, illustrate an embodiment of the present invention. An optical switch, designated generally at 10, is illustrated. The switch 10 includes a moveable optical component 24, which is mounted on an armature or arm 20. When the armature pivots, there is a corresponding movement of the optical component 24 within the plane of rotation.

The embodiments shown in FIGS. 1A–1C also illustrate a structural framework, designated generally at 16, which includes a top portion 80 that can serve as an optical bench. The top portion 80 can be used to mount input and output optical fibers or other input/output devices (see FIGS. 3A–3D) that are used with the optical switch 10. In addition, a base 81 provides support for various switch components.

It will be appreciated that the overall structural framework 16 illustrated in FIGS. 1A–1C is merely an illustration of one presently preferred structural framework for an optical switch, and that other structural approaches could be used. The contour, size, or other geometric features of this structural framework can be modified depending on the particular switch application and switch environment by applying techniques well known in the art. For example, the switch configuration illustrated is referred to as a "T-switch." Another embodiment can be implemented as an "H-switch." Furthermore, the structural framework 16 can have other forms that provide proper support to the elements of the optical switch, and the framework can also partially or totally be provided by the structure within which the optical switch is located. Moreover, the structural framework of the optical switch of this invention comprises the variety of embodiments that can be designed by applying ordinary skill in the art to manufacture a structural framework that is suitable for operating in a variety of environmental conditions, including wide ranges in pressure, temperature and humidity.

The optical component 24 of the switch 10 rests on the moveable armature 20, which is partially disposed within an open cavity 19 formed within the switch framework 16, best seen in the cross-sectional view of FIG. 1C. Movement of the armature 20 imparts the requisite movement to the optical component 24. The armature moves the optical component through the switching motion by rotating about a pivot. Preferably, the pivot that is provided has a low torsional stiffness about the axis of rotation of the pivot and yet maintains a relatively higher torsional stiffness in directions perpendicular to the pivot rotational axis (within the "plane of rotation"), thereby maintaining the optical alignment of the optical component to substantially the same plane throughout the switching motion. In a preferred embodiment, the pivot includes a crossed flexure assembly, designated generally at 30 in FIGS. 1A–1C. As will be discussed in further detail below, the armature 20 is operably attached to the crossed flexure assembly 30 so that the armature pivots about the rotational axis provided by the flexure 30.

The flexure pivot assembly 30 provides a pivot that has relatively low torsional stiffness about the axis of rotation, and a relatively higher torsional stiffness about the axes that are substantially perpendicular to the axis of rotation. These characteristics are particularly important in the context of optical communications. In particular, the flexure pivot assembly 30 provides an accurate and precise pivot mechanism for moving the optical component, even after repeated cycles of operation or periods of non-switching. Moreover, the flexure pivot characteristics ensure that the optical component remains in substantially the same plane throughout the entire switching motion. This precise movement ensures that the optical component 24 remains in proper optical alignment throughout the switching motion, thereby ensuring accurate retransmission of the light signal. In some applications, maintaining alignment of the optical component to the plane of rotation enables a smooth and continuous transition between switch states, without abrupt disturbances in the optical data. Also, the structural rigidity of the flexure assures that this alignment is maintained, even if subjected to mechanical vibration.

In addition to the pivot means, presently preferred embodiments of the switch 10 include a means for selectively actuating the switch to a plurality of predefined switch positions. In the illustrated embodiment, this is the facility that physically causes the armature to pivot about the flexure pivot 30 and thereby impart corresponding motion to the optical component 24. By way of example and not limitation, in a preferred embodiment the actuation means is comprised of a permanent magnet 50 (seen in FIGS. 1C, 2A and 2B), and external pole pieces 51 and 52 that are oriented so as to operably interact with a stationary solenoid 60. Alternatively, a single pole piece could be utilized.

Figure 2A:
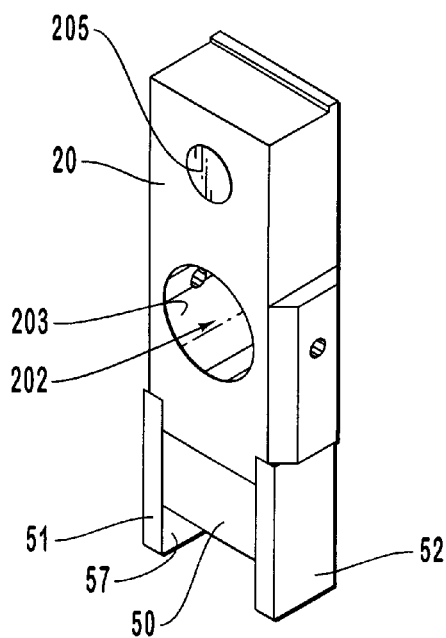
FIG. 2A is a simplified perspective view of an embodiment of an armature and magnet assembly.
Figure 2B:
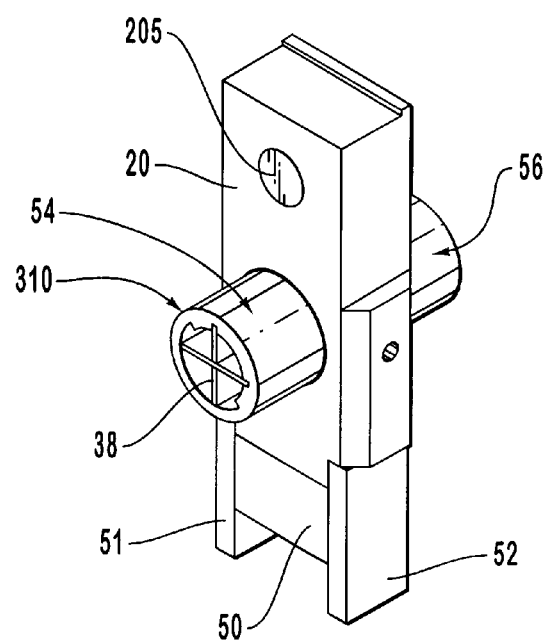
FIG. 2B is the armature of FIG. 2A with one embodiment of a flexure pivot operably attached thereto.

FIGS. 1C, 2A–2B illustrate how in a preferred embodiment the armature 20, the magnet 50, and each of the external pole pieces 51 and 52 are assembled into an integral unit. The magnet 50 is preferably incorporated within the body of the armature 20, typically by riveting, bolting, gluing, or other attachment, and is oriented so that its north and south ends are positioned on opposite sides of the armature 20, essentially perpendicular to the axis of rotation. As is shown in FIG. 2A, the armature 20 further includes a cylindrical bore 202, the inner surface 203 of which is sized and shaped to receive and engage a portion of the outer surface of a flexure pivot. One example of how a pivot assembly having crossed flexures could be received within the bore 202 is shown in FIG. 2B. In this particular example, the flexure pivot illustrated is the double-ended embodiment shown in FIG. 4C (described in further detail below), and is designated generally as 320. An outer surface of the center structure 59 (FIG. 4C) of the flexure is received and attached to the armature 20 within bore 202. The other ends of the flexure (54 and 56) are attached to the switch frame 16 within a cylindrical bore 31, as shown in FIG. 1B. In this way, the armature 20, the magnet 50 and the pole pieces 51 and 52 together pivot about the rotational axis of the flexure pivot assembly 320. It will be appreciated that other flexure pivots, described below, may attach to the armature 20 in a similar manner, as will be apparent from their respective descriptions. If needed, the armature 20 can include a counter-weight 205.

Referring again to FIGS. 1A–1C, the solenoid 60 is affixed to the base 81 of the switch frame 16. The solenoid 60, which includes a yoke 65 and a core 66, is operably connected to a control circuit (not shown) that is used to apply an electric current to the solenoid 60 in a selected direction, and thereby induce a magnetic polarity. The armature 20 and magnet 50 assembly are oriented with respect to the solenoid 60 so that when a magnetic polarity is induced, the pole piece 51 or 52 having an opposite magnetic polarity will be attracted, and the other pole piece having the same magnetic polarity will be repelled. This combined repulsion and attraction causes the magnet 50 and the armature assembly to pivot about the rotational axis of the flexure pivot assembly 30. This movement is schematically represented by arrow A in FIGS. 1A and 1B (or opposite to arrow A when an opposite electric current is supplied to the solenoid 60). This pivoting action causes the optical component 24 to move between switch positions as is represented by the directional arrows C and D in FIG. 1C. Moreover, the operating characteristics of the flexure pivot 30 ensure that the optical component 24 remains in substantially the same plane as it is displaced between respective switch positions.

The permanent magnet provides additional functionality. In particular, the magnet provides one means for latching the armature and the optical component at the last selected switch position when the electrical current is removed from the solenoid 60. Other schemes for providing a latching function could also be used, if desired. It will be appreciated that while in a preferred embodiment the actuator is comprised of the above-described magnet and stationary solenoid arrangement, that other structures for affecting the movement of the armature could be used. For example, other electronic actuation devices could be used such as a motor. Moreover, the orientation of the magnet with respect to the solenoid could also be varied, depending on the particular switch configuration.

The relative position of the optical component 24 corresponds to the operating positions of the switch 10. Depending on the type of optical component 24 being used, the rotation of the armature 20 about the rotational axis of the flexure pivot assembly 30 must be precisely controlled so that the optical component 24 is positioned correctly. This is accomplished in one preferred embodiment by defining stop positions that physically stop the rotation of the armature 20 at a defined point. In a preferred embodiment the stop positions are defined by stop surfaces formed on a ball stop 62 that is affixed to the top of the solenoid core 66. These stop surfaces, designated at 53 and 55 in FIG. 1C, are designed to stop further rotational movement of the armature 20 by obstructing the pole pieces 51 or 52 when the armature 20 has rotated a predefined distance.

For example, when pivoting takes place in a clockwise direction about axis LA, as is designated in FIGS. 1A and 1B at direction arrow A, pole piece 52 is attracted to, and pole piece 51 repelled from, the core element 60. This pivot motion continues until it is arrested when stop surface 55 (represented in FIG. 1C) on ball stop 62 obstructs pole piece 52. Movement of the armature 20 and magnet 50 assembly in turn causes the optical component 24 to move in the direction denoted by the schematic arrow representation at D in FIG. 1C. This would correspond to one switch position for the optical component 24. The magnet 50 will latch the switch in this position until an opposite electrical current is supplied to the solenoid 66, causing the switch to assume the second position, wherein the other pole piece 51 is attracted to the ball stop 62. The latching feature allows the current to solenoid to be removed while retaining the selected switch state (position), thus reducing the energy consumption of the switch. While in the illustrated embodiment, switch positions are defined by the stop surfaces at 53 and 55 on ball stop 62, it will be appreciated that other configurations could be used to control movement of the armature 20 and the magnet 50 assembly. Preferably, a stopping mechanism is designed so that it does not affect the orientation of the optical component 24 relative to the plane of rotation of the armature 20. Furthermore, while the above embodiment is designed to latch in the last-switched position, it may be desirable to provide a switch that fails to a selected default position.

In another alternative embodiment, the stop positions are cushioned, which minimizes vibration, or "bounce", when a stop position is reached, thus improving the transition between switch states. Vibration could cause, for example, intermittent loss of signal in a through channel. The vibration typically depends on the natural frequency of the armature-pivot assembly, which is affected by the moment of inertia of the armature and the flex pivot characteristics, among other factors. For typical switches, however, the natural frequency is within the range from about 2000 Hz to about 6000 Hz. Excitation at these high frequencies requires that the armature be subjected to a forcing function that includes these frequencies, which an abrupt metal-to-metal contact might produce. The incorporation of cushioned stops prevents the forcing function from including frequencies that would otherwise cause undesirable vibration. For example, an annular spherical ring comprised of a thin barrier of silicone rubber could be affixed to the ball stop 62 to thereby form cushions at each stop surface 53 and 55. Alternatively, a cushion could be affixed to the inner surface of each pole piece.

In a particular embodiment, the ball stop 62 does not include a barrier of silicone rubber; however, the faces of the pole pieces that would otherwise contact the metal ball stop, for example inner face 57 on pole piece 51 in FIG. 2A, are coated with a polymer material, such as polytetrafluoroethylene ("PTFE") sold under the trade name TEFLON S™ by the E.I. DUPONT DE NEMOURS AND COMPANY. The PTFE coating is typically about 25 microns (1 mil) thick and coats the entire inner surface of the pole piece, but may be limited to the portion that will contact the stop. Those skilled in the art will appreciate that other materials might be used, such as other fluoropolymers, other polymers, and polymer composites. Similarly, the coating might be placed on the ball stop or similar stationary structure, rather than the movable pole pieces. It is desirable that the coating be non-magnetic (i.e. have a magnetic permeability essentially equal to or less than empty space) to provide a gap in the magnetic circuit between the solenoid core (ball stop) and the attracted pole piece. It is similarly desirable that the coating has a relatively low coefficient of friction. This gap between the attracted pole piece and the solenoid core enhances operation of the switch by allowing an easier transition to the opposite switch state when the polarity of the solenoid is reversed. It is believed that the non-magnetic, low friction, limited flow (yield), and other properties of the PTFE coating contribute to improved switching, improved aging characteristics, and increased switch lifetime. Furthermore, the coating appears to reduce bouncing of the switch, thus improving the transition between switch states. Depending on the specific application, it may be desirable to include other elements, like an additional dampening bumper or nonmagnetic spacer, in addition to a coating on the inner surface of the pole pieces.

In some applications, an exact positioning of the optical component may not be critical. For example, the optical component could be a relatively large mirror that is either placed in the path of the light signal, or removed from the light signal path. Under these circumstances, precise stop positions of the optical component may not be needed.

FIGS. 3A–3D illustrate exemplary operating environments for a switch 10 using a flexure pivot. These figures illustrate a portion of the switch 10, including an optical component 24 mounted on the movable armature 20 as it might be used in an optical communications system, for example. FIGS. 3A–3D show the switch used in 1×2 applications. An example of such an application might be in a wave division multiplexed communication system or other optical communication or transmission system. It is understood that the present invention could be applied differently, such as switching an attenuator in and out in a 1×1 switch configuration, for example.

Figure 3A:
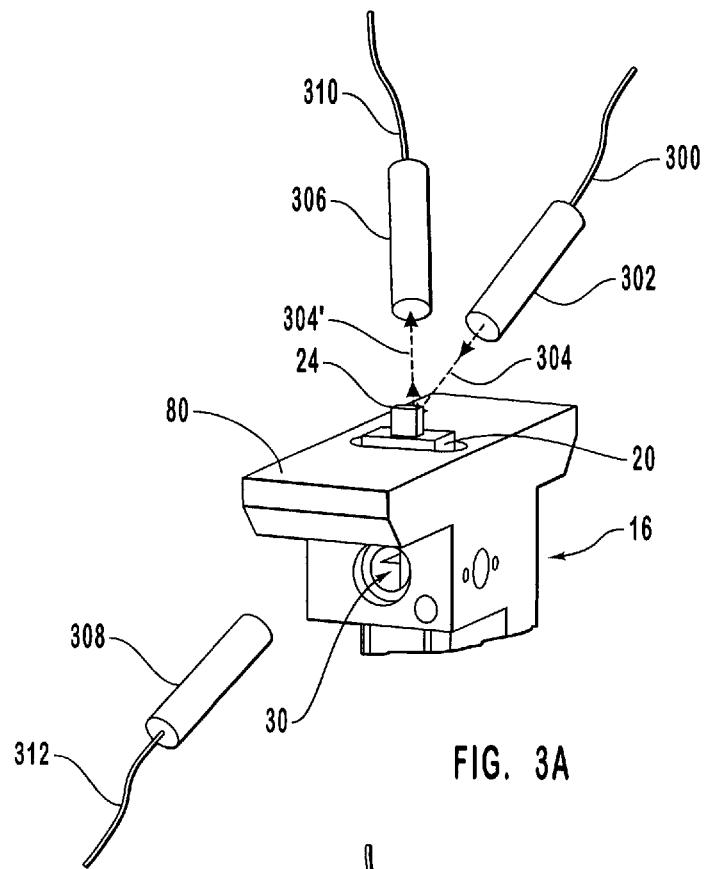
FIGS. 3A–3D are simplified representations of portions of optical communication systems using the optical switch.
Figure 3B:
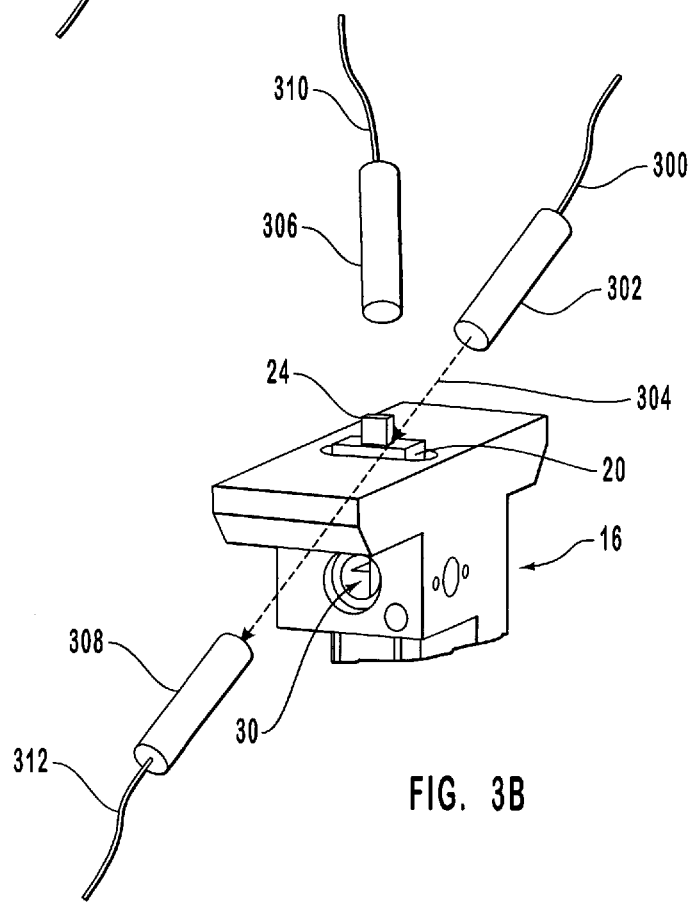

In the example of FIGS. 3A and 3B, the switch 10 includes an input optical fiber 300 that carries a light signal originating from a source (not shown) in the communication system. It is understood that the terms "input" and "output" are used for convenience of illustration, and that signals or the light waves might not strictly propagate in such a simple fashion, and that the switches could be operated with alternative signal orientations. The light signal from the input fiber 300 is in turn supplied to a rod lens 302, such as a GRIN lens. The input rod lens 302 will expand a light beam from input optical fiber 300 so that it is collimated when it emerges from the inner end of the lens. The collimated light signal is designated at dotted line 304. The switch 10 further includes two output ports, each output port also having a GRIN rod lens 306 and 308, which are in turn connected to corresponding fibers 310 and 312. Each of the output rod lenses 306 and 308 focus a light beam received at its inner end and couple it into the corresponding output optical fibers 310 and 312 at its opposite end. Although not shown, each of the optic fibers 300, 310 and 312 are connected to various portions of an optical transmission system.

It will be appreciated that while the lenses 302, 306 and 308 are represented as being external to the switch 10, in typical use the lenses would be mounted, for example, on the top surface 80 of the switch housing 16.

In operation, the electrical circuit applying current to the solenoid 60 would be selected based on the desired switch position. For example, in FIG. 3A the current is supplied so as to rotate the armature and the optical component 24 to the position shown. This switch position corresponds to the optical component, which in this case is an optical mirror, to be positioned in the path of the light beam 304. In this position, the mirror reflects and redirects the light beam, represented by the dashed line 304', to the first output lens 306. Conversely, FIG. 3B illustrates a situation wherein the armature is rotated so as to move the mirror optical component 24 to a different switch position. In this position, the mirror is removed from the path of the light beam 304, which is allowed to enter the second output lens 308.

Figure 3C:
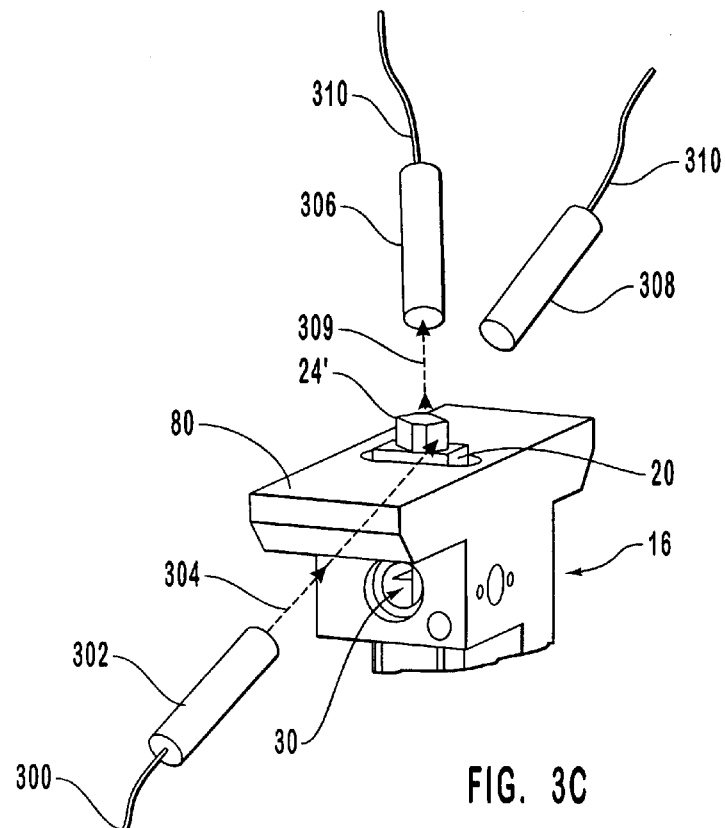
Figure 3D:
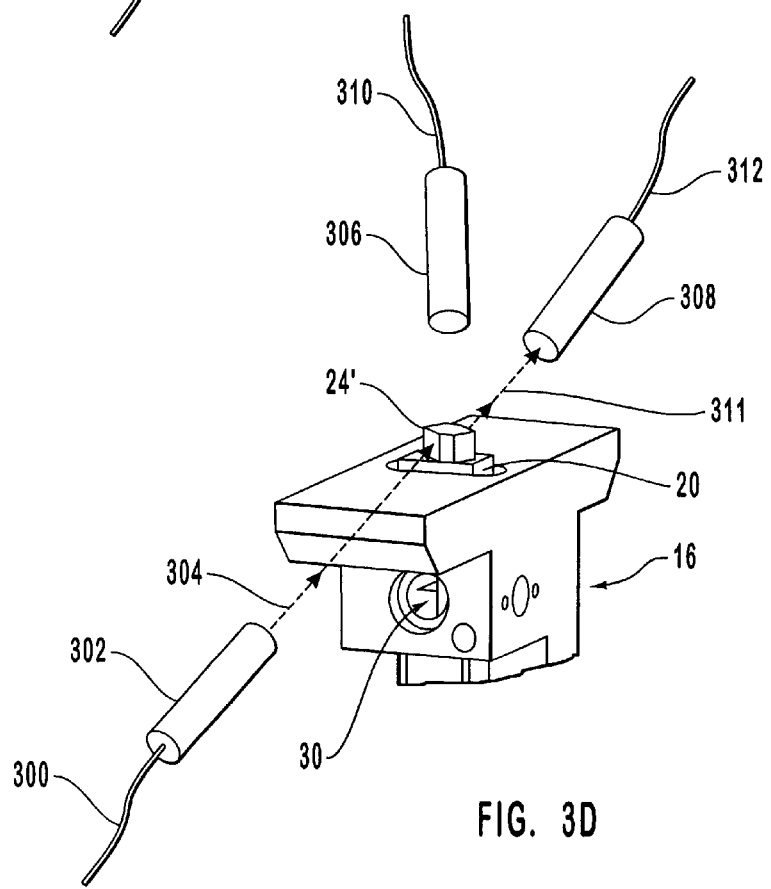

FIGS. 3C and 3D illustrate an alternative operation. In this particular example, the optical component is a prism 24'. Again, the light signal is redirected to one of two output fibers, based upon the switch position of the prism 24'. For example, in FIG. 3C the current is supplied so as to rotate the armature and the prism 24' to a position such that the incoming light beam 304 contacts the prism 24' at a point so that it is redirected to enter the output lens 306, as indicated by the dashed line 309. Conversely, FIG. 3D illustrates the situation wherein the armature is rotated to move the prism to a different switch position. In this position, the light beam 304 enters the prism 24' so that it is redirected to enter the output lens 308, as indicated by the dashed line 311.

It will be appreciated that the examples shown in FIGS. 3A–3D are illustrative only. The manipulation of the incoming light signal can be accomplished in many different ways depending on the type of moveable optical component used.

Also, switches having multiple optical components could also be used. Embodiments of the switch 10 of the present invention also find particular usefulness in other types of optical systems. One example is disclosed in a co-pending patent application serial No. 60/121,420 filed on Feb. 23, 1999, entitled HYBRID FILTER SWITCH by Michael A. Scobey and Robert W. Hallock, and assigned to the same assignee as the current application. That application, which discloses an optical switch that can be used to provide more complex switching functions, is incorporated herein by reference. For instance, a hybrid filter switch may be used to selectively redirect specific wavelengths carried by an input light signal into a different exit fiber or fibers. For example, out of N discrete frequencies present in the incoming light signal, the switch may be configured to direct certain of the frequencies into one selected output fiber, and the remaining frequencies into another output fiber. Operation of this type of switch requires extremely precise movement of the switch optical component, a particular advantage of embodiments of this invention.

Figure 4A:
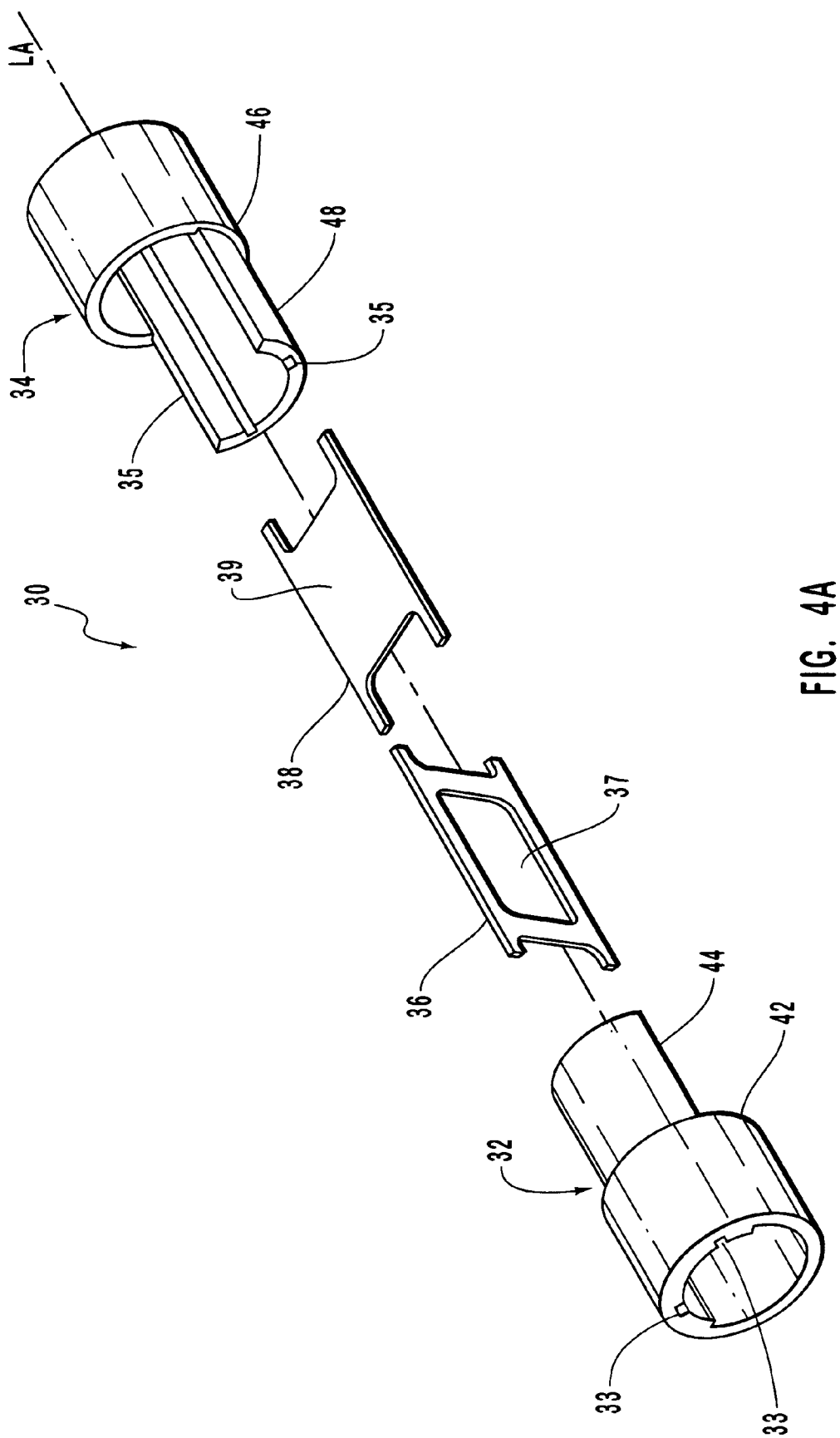

Reference is next made to FIG. 4A, which illustrates a perspective exploded view of one preferred embodiment of a flexure pivot assembly 30 that can be used to provide the function of a pivot means. Illustrated is a four-piece crossed flexure that comprises two support structures 32 and 34. Each support structure 32, 34 includes internal slots 33 and 35, which engage corresponding edges of the flat springs 36 and 38 that are arranged in a cross-flexure configuration when assembled. The embodiment shown in FIG. 4A typically operates in a cantilevered configuration. The support structure 32 is configured as a cylindrical outer surrounding portion 42 and an arcuate reduced diameter or undercut portion 44. When assembled, the undercut portion 44 extends within a mating surface within cylindrical outer surrounding portion 46 of support structure 34. The cylindrical outer portion 46 has a reduced diameter or undercut portion 48 for the same assembled arrangement with the cylindrical outer surrounding portion 42. This structure can act as bearing structure, providing rotation between the two support structures, while limiting motion normal to the axis of rotation. The flat springs 36 and 38 are assembled so that a solid center 39 of spring 38 is disposed within an open center 37 of spring 36, as is shown in FIG. 4B. The support structures 32 and 34 in the embodiment shown in FIG. 4B are slightly modified in that they have key ways 49 formed along the outer surface. These key ways can be used to facilitate the positioning of the support structures 32 and 34 and hence of the crossed flexure, within the armature and/or the switch frame 16, as well as provide coupling between the support structures and complimentary elements. The embodiments shown in FIGS. 4A and 4B would be operably connected within the switch 10 in essentially the same manner. In particular, one of the support structures 32 or 34 would be affixed to an inner bore 31 formed within the switch frame 16. The other support structure would be operably attached to the armature, for instance, by being received within the bore 202 formed within the armature 20.

FIG. 4C shows an exploded view of an embodiment of a double ended symmetrical crossed flexure in a five-piece configuration that includes unitary support structures 54 and 56. These support structures have reduced diameter or undercut portions 58 and 60 which project within complementary interior surfaces formed by cylindrically shaped center structure 59. Springs 36 and 38 resiliently support structures 54 and 56 with respect to center structure 59. This flexure would be operably connected to the switch 10 in the manner previously described in connection with FIG. 2B.

FIGS. 5A–5C show exploded views of exemplary embodiments of four-piece crossed flexures designated at 330, 340 and 350, with different structural features such as integrally formed platform 70 and lever support 71 in FIG. 5A, integrally formed flanged ends 72 in FIG. 5B, and integrally formed square ends 73 in FIG. 5C.

In addition to the type of flexure pivot arrangement that is shown in FIGS. 4A–4C and 5A–5C, it will be appreciated that other types of flexure pivots having low torsional stiffness about rotating axis and a relatively higher torsional stiffness about the axes that are perpendicular to the rotating axis can be used to provide the pivot means function.

Figure 6A:
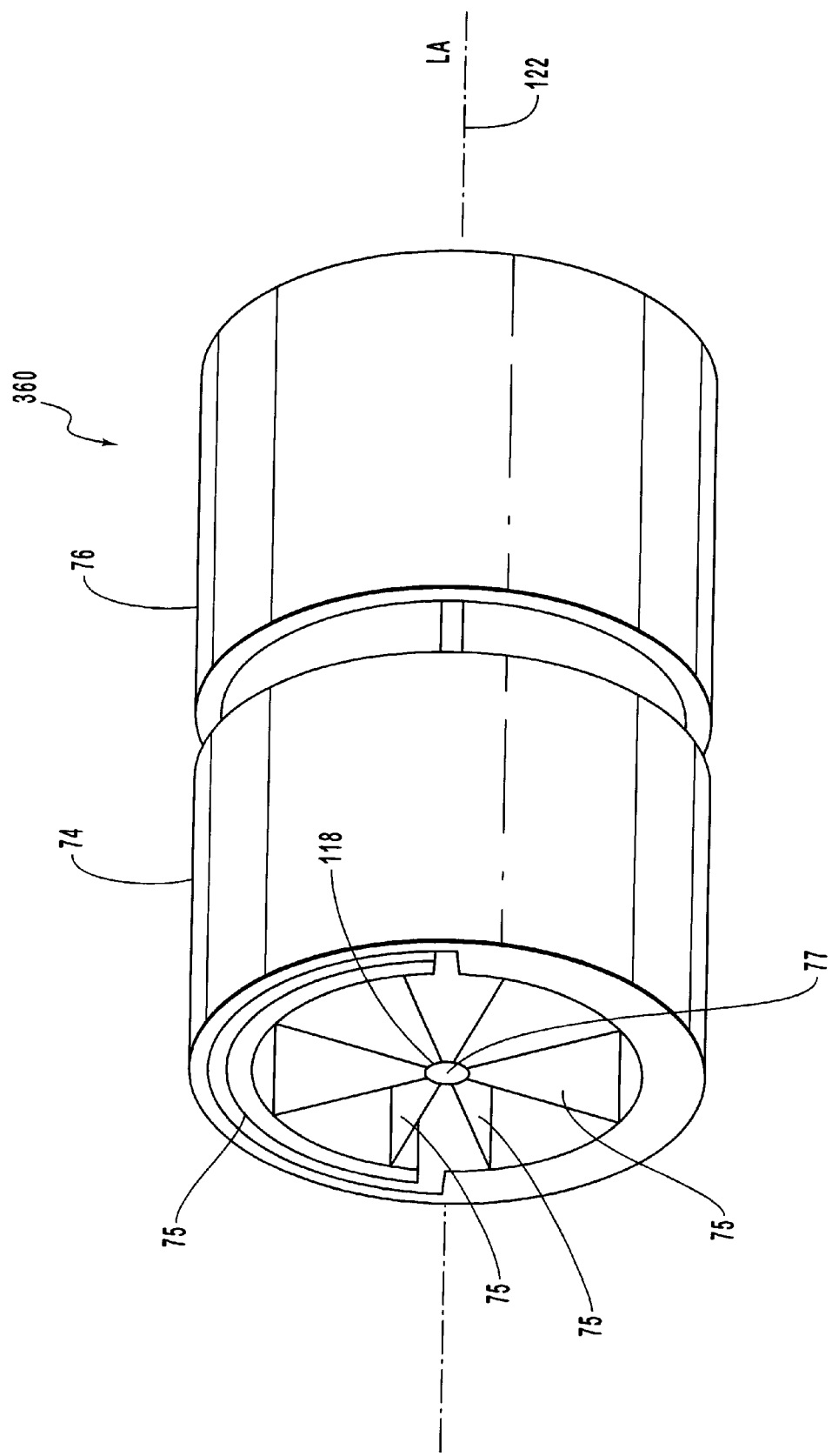
FIG. 6A is a perspective view of an embodiment of a rotary mount flexure pivot.
Figure 6B:
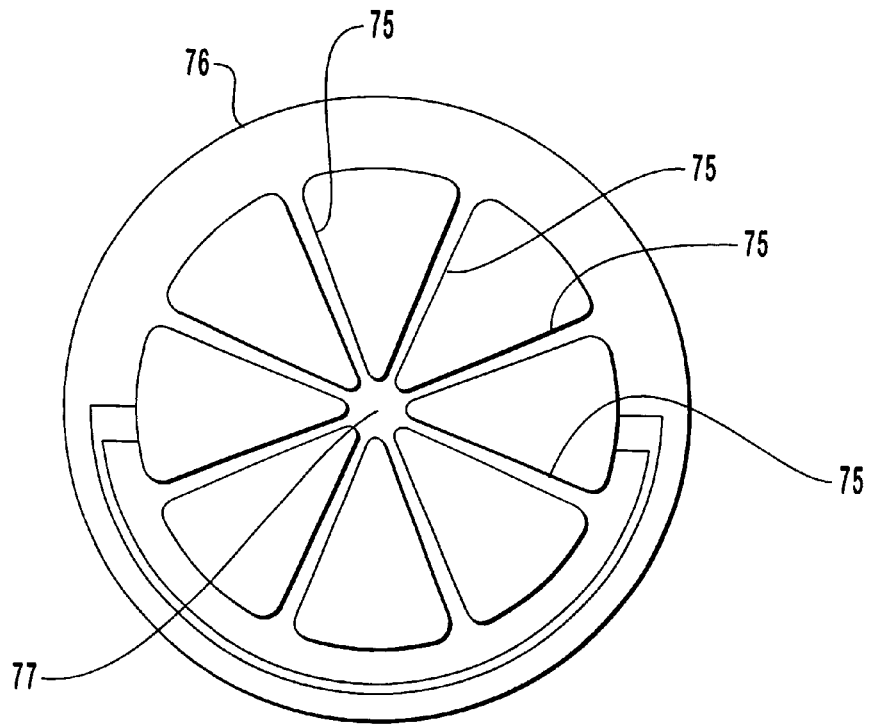
FIGS. 6B and 6C show end views of the embodiment schematically depicted in FIG. 6A.
Figure 6C:
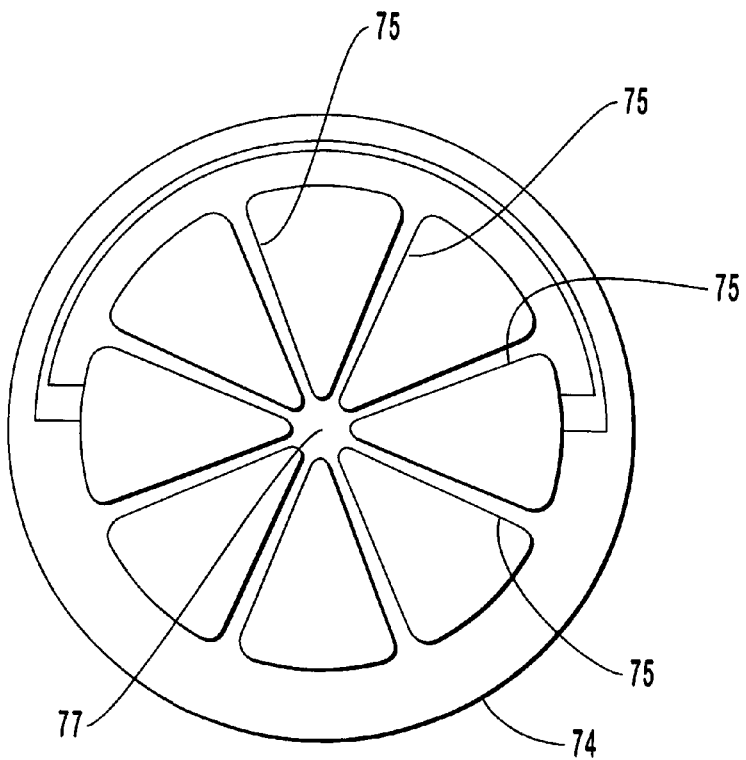

FIG. 6A shows a pivot means that can be embodied by a rotary mount flexure pivot 360. This flexure pivot comprises two hollow cylindrical mounts 74 and 76 that are axially aligned along the longitudinal axis LA. This is the axis about which the flexure pivot has low torsional stiffness. At least two flexure members 75 are disposed in the interior of these two mounts and these flexure members are integrally interconnected with each of these two mounts and cross to define an intersection 77. Flexure members 75 in this embodiment of a flexure pivot are integrally interconnected with each other along the entire length of intersection 77. In this embodiment, the mounts move relative to each other by a relative rotation about the flexure member intersection 77 that defines axis LA as shown in FIG. 6A. FIGS. 6B–6C show end views of the embodiment of the flexure pivot schematically shown in perspective view in FIG. 6A.

Figure 7:
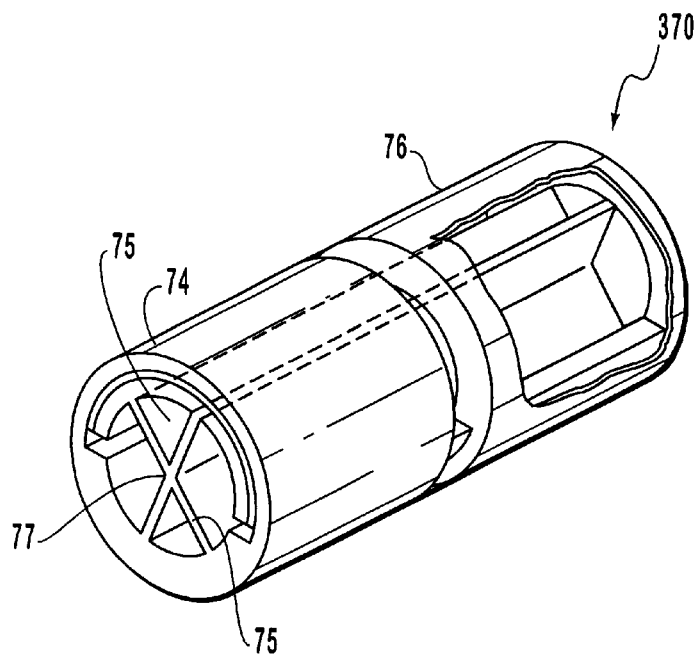
FIG. 7 is a perspective view with a cut-away section of another embodiment of a rotary mount flexure pivot.

FIG. 7 shows a schematic perspective view with a cut away section of another embodiment of the flexure pivot similar to that shown in FIGS. 6A–6C, but the embodiment shown in FIG. 7 comprises only two flexure members 75. Additional information regarding the flexure pivots schematically illustrated in FIGS. 4A–4C, 5A–5C, 6A–6C and 7 is provided in U.S. Pat. Nos. 4,997,123 and 5,620,169, for example.

Figure 8:
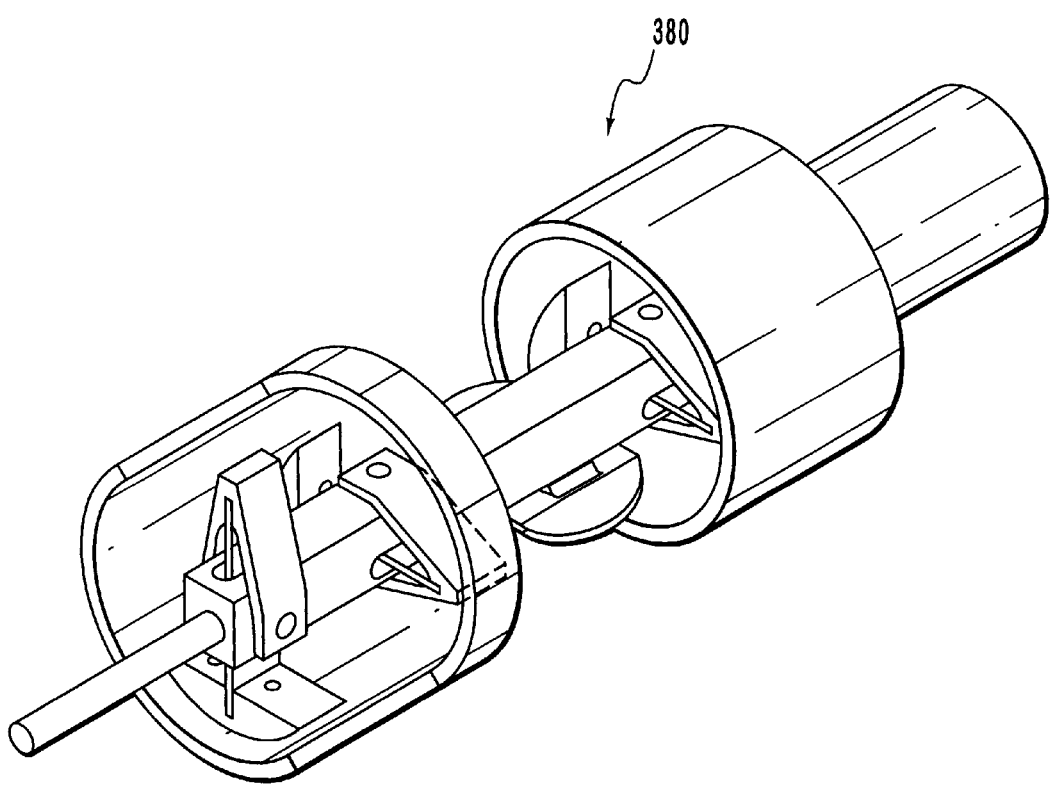
FIG. 8 is a perspective view with a cut-away section of another embodiment of a flexure pivot.

FIG. 8 shows another embodiment of a flexure pivot, designated generally at 380. Additional information regarding this flexure pivot assembly is provided in U.S. Pat. No. 4,802,720. As has been previously noted, when a flexure pivot such as the embodiment shown in any of FIGS. 4A–4B, 6A–6C is operably connected within optical switch 10, one of the support structures (i.e., 32 or 34 in FIG. 4A) or one of the hollow cylindrical mounts (i.e., 74 or 76 in FIG. 6A) is attached to the structural framework 16 of the optical switch 10. For example, as is shown in FIGS. 1A–1C, a cylindrical cavity 31 is formed within the framework 16, which then receives a corresponding support structure. The other support structure or the other hollow structural mount of the flexure pivot is then operably connected to the armature 20, for example, by being received within cylindrical bore 202. This particular configuration is referred to as a cantilevered pivot.

Alternatively, a double ended symmetrical crossed flexure, such as the embodiment shown in FIG. 4C, is operably connected within the switch 10 in the manner described above in connection with FIG. 2B. Whereas pivots according to this invention can be manufactured in cantilevered and symmetrical forms, the double ended symmetrical form of FIG. 4C is the presently preferred configuration for an optical switch.

Attachment of the flexure assemblies to the switch framework and to the armature can be accomplished using a variety of well-known techniques, including but not limited to compression fitting, cementing, fastening, and adhesion fitting. One presently preferred assembly technique is adhesion fitting, particularly with an epoxy resin. A more preferred assembly technique is adhesion fitting with an adhesive material sold under the trade name LOCTITE® by the Loctite Corporation. Other adhesives could also be used, including thermoplastic adhesives.

Other exemplary embodiments of the flexure pivots can be designed by appropriately combining different elements of the flexure pivots shown in FIGS. 4A–4C, 5A–5C, 6A–6C, 7 and 8, and equivalent elements thereof. The plurality of such additional embodiments is not herein illustrated with additional features because such modifications can be achieved by applying ordinary skill in the art.

To summarize, embodiments of the present invention address many of the problems with optical switches in the prior art. In particular, the unique properties of the flexure pivot result in a superior switching mechanism. The flexure pivot provides an extremely precise and accurate movement of a switch's optical component thereby maintaining a precise optical alignment throughout the switching motion. This ensures a high degree of data reliability when used in an optical communication system. Moreover, the structural rigidity of the flexure pivot allows the switch to be used in operating environments that are exposed to mechanical vibrations while still maintaining precise optical alignment. Also, the flexure pivot does not utilize any rolling or sliding parts and is thus less subject to failure, even after thousands of cycles of operations, and does not require ongoing maintenance such as lubrication. The result is a more reliable and precise optical switch that is ideally suited for a wide range of optical communications system applications.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical switch for use in an optical communication system, the optical switch comprising:
    a structure framework;
    a flexure pivot assembly, the flexure pivot assembly having a first mounting portion coupled to the structure framework, a flexure coupled to the first mounting portion and to a second mounting portion, the second mounting portion being coupled to
    an armature configured to rotate about a rotational axis of the flexure pivot assembly;
    an optical device mounted on the armature; and
    an actuator capable of operating on the armature to switch the optical device from a first switch position to at least a second switch position by rotation of the armature about the rotational axis of the flexure pivot assembly, wherein the optical device remains essentially within a plane normal to the rotational axis during a switch operation.

2. The optical switch of claim 1 wherein the optical device is selected from the group consisting of an optical waveguide, a mirror, a prism, a diffraction grating, an attenuator, a lens, and a filter.

3. The optical switch of claim 1 wherein the actuator is a solenoid and the armature further includes a permanent magnet configured to magnetically couple to the solenoid to perform the switch operation.

4. The optical switch of claim 3 further including a first pole piece and a second pole piece, the first pole piece being magnetically coupled to a first pole of the permanent magnet and the second pole piece being magnetically coupled to a second pole of the permanent magnet.

5. The optical switch of claim 1 further comprising a stop to limit travel of the armature to place the optical device at a preselected location.

6. The optical switch of claim 5 wherein the stop comprises a pole piece configured to impinge on a core portion of a solenoid.

7. The optical switch of claim 5 wherein the stop further comprises a cushion.

8. The optical switch of claim 1 wherein the flexure pivot assembly further includes a third mounting portion, the third mounting portion being coupled to the structure framework to form a double-ended flexure pivot assembly.

9. The optical switch of claim 1 wherein the flexure pivot assembly includes a plurality of flexures.

10. The optical switch of claim 9 wherein at least two of the plurality of flexures are crossed.

11. The optical switch of claim 1 further comprising an optical waveguide mechanically coupled to a bench of the structure framework.

12. An optical switch for use in an optical communication system, the optical switch comprising:

a structure framework having a bench;

an optical waveguide mechanically coupled to the bench a flexure pivot assembly, the flexure pivot assembly having a first mounting portion coupled to the structure framework, at least a first flexure and a second flexure, the first flexure being crossed to the second flexure, the first flexure and the second flexure being coupled to the first mounting portion and to a second mounting portion, the second mounting portion being coupled to an armature configured to rotate about a rotational axis of the flexure pivot assembly, the armature including a permanent magnet, a first pole piece and a second pole piece, the first pole piece being magnetically coupled to a first pole of the permanent magnet and the second pole piece being magnetically coupled to a second pole of the permanent magnet;

an optical device mounted on the armature; and an solenoid actuator configured to magnetically couple to the first pole piece and to the second pole piece to switch the optical device from a first switch position to a second switch position by rotation of the armature about the rotational axis of the flexure pivot assembly, wherein the optical device remains essentially within a plane normal to the rotational axis during a switch operation.

13. The optical switch of claim 12 wherein the optical device is selected from the group consisting of an optical waveguide, a mirror, a prism, a diffraction grating, an attenuator, a lens, and a filter.

14. An optical switch comprising:

means for providing an optical input signal to an optical device mounted on an armature;

means for mechanically coupling the armature to a frame, the means for mechanically coupling including a flexure disposed between the frame and the armature and configured to allow the armature to rotate about a rotational axis; and means for selectively actuating movement of the armature about the rotational axis from a first switch position to a second switch position, the optical device remaining essentially within a plane normal to the rotational axis between a first switch position and a second switch position.

15. The optical switch of claim 14 further comprising means for receiving a first optical signal from the optical device when the optical switch is in the first switch position; and means for receiving a second optical signal when the optical switch is in the second switch position.

16. A method for switching an optical signal, the method comprising:

providing an optical signal to an optical device mounted on an armature in a first switch position;

routing the optical signal to a first output port;

selectively actuating the armature to cause the armature to rotate about a rotational axis of a flexure pivot to a second switch position; and routing the optical signal to a second output port.

* * * * *